United States Patent [19]
Eibl

[11] Patent Number: 5,264,102
[45] Date of Patent: Nov. 23, 1993

[54] METHOD AND APPARATUS FOR THE TREATMENT OF AN AQUEOUS LIQUID

[75] Inventor: Gerhard Eibl, Volders, Austria

[73] Assignee: Maitron Gerätebau Ges.m.b.H., Innsbruck, Austria

[21] Appl. No.: 662,975

[22] Filed: Feb. 28, 1991

Related U.S. Application Data

[63] Continuation of Ser. No. 243,553, Sep. 7, 1988, filed as PCT/AT86/00055, Sep. 15, 1986, published as WO87/04422, Jul. 30, 1987, abandoned.

[51] Int. Cl.$^5$ .............................. C02F 1/48; B03C 5/00
[52] U.S. Cl. .................... 204/302; 204/186; 204/305
[58] Field of Search ............... 204/302, 304, 305, 306, 204/307, 308, 149, 186

[56] References Cited

U.S. PATENT DOCUMENTS

| | | | |
|---|---|---|---|
| 3,766,050 | 10/1973 | Pados | 204/302 |
| 4,073,712 | 2/1978 | Means et al. | 204/186 |
| 4,443,320 | 4/1984 | King | 204/302 |
| 4,545,887 | 10/1985 | Arnesen et al. | 204/280 |
| 4,581,119 | 4/1986 | Rajani et al. | 204/302 |
| 4,886,593 | 12/1989 | Gibbs | 204/302 |

FOREIGN PATENT DOCUMENTS

47808/79  6/1980  Australia .

OTHER PUBLICATIONS

Federal Trade Commission Decision on 'Evis Water Conditoner' Claims, Jour. AWWA, Jan. 1959, pp. 708-710.
H. P. Godard, Editorial—Watch Out For Wondrous Water Treatment Witchcraft, Corrosion, Apr. 1974, p. 9.
B. Q. Welder et al., Practical Performance of Water-Conditioning Gadgets, Industrial and Engineering Chemistry, vol. 46, No. 5, May, 1954, pp. 954–960.
Nordell, Water Treatment For Industrial And Other Uses, 2nd Edition, Reinhold Publishing Corp., New York, 1961, pp. 268-272.
G. V. James, Water Treatment, 3rd Edition, The Technical Press, Ltd., London, 1966, pp. 164-167.
R. Eliassen et al., So-called Electrical and Catalytic Treatment of Water and Boilers, Jour. AWWA, Jul., 1952, pp. 576-582.
R. Eliassen et al., Experimental Performance of Miracle Water Conditioners, Jour. AWWA, Oct., 1958, pp. 1371-1385.

*Primary Examiner*—John Niebling
*Assistant Examiner*—William T. Leader
*Attorney, Agent, or Firm*—Sughrue, Mion, Zinn, Macpeak & Seas

[57] ABSTRACT

Apparatus for the treatment of an aqueous liquid includes a flat, cylindrical treatment chamber made of electrically insulating material. Two flat electrode plates are disposed parallel to and spaced from each other in opposite side walls of the treatment chamber. Each electrode plate is insulated from the liquid by a thin layer of electrical insulation. One terminal of a d.c. high voltage source is connected to the electrode plates so that the same voltage is applied to both plates. The opposite terminal of the voltage source is connected to electrically conductive means in direct contact with the liquid so that an electrostatic field is established between the two electrode plates and the liquid itself.

2 Claims, 2 Drawing Sheets

METHOD AND APPARATUS FOR THE TREATMENT OF AN AQUEOUS LIQUID

No. 07/243,553 filed Sep. 7, 1988, filed as PCT/AT86/00055, Sep. 15, 1986, published as WO87/04422, Jul. 30, 1987, now abandoned.

BACKGROUND OF THE INVENTION

This invention relates to a method for the treatment of an aqueous liquid, whereby the liquid is subjected, during circulation between two opposing electrodes separated from the liquid by means of insulation material, to the effect of an electrical field formed by connecting the electrodes to a dc-high-voltage potential, particularly for the removal of boiler scale and corrosion, or for the prevention of the formation of boiler scale and corrosion in the containers or pipe systems through which the treated liquid flows. In addition, the invention relates to a device for the execution of the method with a treatment chamber having an inlet and outlet and with two electrodes, arranged opposite each other on either side of the treatment chamber and electrically insulated from the treatment chamber, as well as with an electrical dc-high-voltage sourse connected to the electrodes.

Because of substances of various kinds that are contained in water, particularly lime dissolved in water, boiler scale and corrosion are caused in containers and pipes in which water is exposed to physical effects, such as intensive heating in hot-water boilers and steam kettles. It is known that countermeasures can be taken against the unwanted precipitation of substances contained in the water which result in boiler scale, and against the formation of corrosive properties of the water by subjecting the water, before it reaches the containers or pipes in which it is exposed to special conditions, to the effect of an electrical and/or magnetic field. By this means it is possible to reduce, to a greater or lesser extent, the tendency for the development of corrosive properties of the water, and it is also possible to reduce again the extent of boiler-scale formation and corrosion, produced in containers or pipes by supplying them with untreated water, by supplying the containers or pipes with water treated as described above. The extent of the effect of the treatment of water or aqueous liquids with magnetic and/or electrical fields depends also significantly on the intensity of the physical conditions acting on the water of or the aqueous liquid after such a preliminary treatment. Thus, for example, the effect that can be achieved with techniques that have become known up to now decreases in proportion to the thermal load to which the pretreated water is subjected. Various known devices have only a slight effect and very often these devices have a relatively costly construction and require constant and costly maintenance, and for this reason alone they are scarcely suitable for general use. Many of these devices require that a special prefilter be installed ahead of them, and this results in additional procurement and maintenance costs.

From GB-A 1 274 902 a device of the above described type is known, in which the two electrodes, separated from the liquid by insulating material, are connected to the two opposing polarity carrying clamps of a dc-voltage source. This reference also mentions the possibility of separating only one of the two electrodes of such a device from the liquid by means of insulating material. A preferred embodiment has several sequentially arranged treatment units, each with two electrodes, separated from the liquid by insulating material, whereby two dc-voltage fed treatment units are followed by one fed with ac-voltage.

From U.S. Pat. No. 4,073,712 a device for the electrostatic treatment of water is known, in which the liquid to be treated is led through an annular gap formed between two coaxially arranged cylindrical electrodes, whereby both electrodes are separated from the liquid by means of insulating material and connected to the two clamps with opposing polarity of a dc-voltage source.

In addition, a device is known from BE-A 465 481 in which a flowing liquid is exposed to the effect of an electrical alternating field. In this device the liquid flows through a glass tube, on the outside of which, thus separated from the liquid, an electrode is arranged which is connected, as is an electrode located coaxially inside the tube within the liquid, to an ac-voltage source.

SUMMARY OF THE INVENTION

It is an object of the present invention to provide a method and apparatus of the type described in the introduction, with which it is possible to achieve a better effect than is possible with the known technologies of the type discussed herein, and which can be realized in a simple manner at lower cost.

The process according to the invention is characterized by the fact that the liquid to be treated is subjected to an electrical field effect formed by a dc-high-voltage potential with one pole on two opposing electrodes, which are insulated from the liquid, and with the other pole electrically conducting in the liquid. With this process it is well possible to respond to the above cited goal. It can be assumed that the advantageous properties of the procedure according to the invention are due to the fact that the water or aqueous liquid sustains a change in the area of the surface layer flowing along the insulation of the electrode(s), which strongly counteracts the precipitation of substances contained in the liquid and the creation of corrosive properties in the liquid. Aqueous liquids respond to the described field effect because water molecules are themselves dipoles and the substances contained in the water (either dissolved or not dissolved) are present in the form of positive or negative ions and can thus be oriented in accordance with their polarity. Thus, during the preparation of boiling water with rod-type heating elements, in practical tests the deposits that result when water with a high lime content is heated can be reduced by pretreatment of the water to one-quarter of that compared to the use of water that is untreated. In addition to this, when water pretreated in accordance with the present invention is used, the quantity of deposits that occur on the rod-type heater elements during the preparation of boiling water does not exceed a specific limiting value even after a longer period of operation. Also, deposits or boiler scale that have formed previously when untreated water is used for the preparation of boiling water are clearly diminished during the subsequent use of water that has previously been treated with the process according to the present invention. It seems that, for the achievable effect it is not so much the absolute value of the dc-high-voltage used which is the influence, but rather the electrical field strength present in the liquid which also forms an electrode layer on the electrodes or in the insulation of it, and, in connection with it, the load densities occurring in the liquid, as well as the electrode surface. The respective distance between these electrodes is also of importance.

In addition, it is preferred, for the greatest possible holding back of the precipitation of substances contained in the liquid that the liquid is held in the area of the electrodes, at a negative potential relative to the electrode(s). However, it is also possible to keep the liquid in the area of the electrodes at a positive potential relative to the electrode(s) and thus counteract the intrusion of liquid particles or substances contained in the liquid into the insulation covering the electrode.

The effect of the treatment of the liquid according to the invention can be considerably improved if the liquid is subjected in the area of the electrodes to a flow direction change of approximately 180°.

The device according to the invention is characterized by the fact that the two opposing electrodes are electrically connected and one terminal of the electrical dc-high-voltage source is connected to the two electrodes, and the other terminal is connected to a contact electrode forming the electrically conducting connection to the liquid. This device can provide a very good treatment effect with very simple construction and relatively little high-voltage. A d.c. current source is preferably used as high-voltage source. It is a further advantage if the positive terminal of the high-voltage source is connected to the electrically insulated electrodes and the negative terminal is connected to the contact electrode disposed in the liquid.

In a simple manner a suitable form for the treatment of the liquid flowing along the electrodes can be attained if it is provided that each of the two electrodes connected together is arranged on the side of a treatment chamber constructed as a flat box. The processing effect achieved with the device can be further improved, in a simple manner, if the flow-through path in the treatment chamber is formed by a U-shaped bridge and the openings for the inflow and outflow of the liquid adjoin each other, on opposite sides of the bridge. With regard to the construction of the treatment chamber and the arrangement of the insulated electrodes, which form electrical condenser plates, it is of particular advantage if the chamber is formed from two can halves made from synthetic material, into the flat side walls of which the insulated electrodes are embedded and which are arranged between and compressed by two clamping plates made of metal. The individual components of the device can be produced in a simple manner and good protection of the insulated electrodes, electrically as well as mechanically, is assured; the electrodes are also well protected against chemical effects. It is also possible, should it prove necessary or desirable at some time, to easily perform maintenance and cleaning of the device, due to the construction of the can from two halves of synthetic material, which permit a simple dismantling of the device. However, it should be pointed out that the device according to the invention is practically maintenance-free. Due to the two clamping plates a mechanically stable construction is attained which also provides for a high pressure resistance of the can, and it is also possible to attain by means of these clamping plates, not only good mechanical protection of the can which forms the treatment chamber, but also an effective electrical shield, which is a security advantage.

The treatment of aqueous liquids according to the invention is not only significant with regard to avoiding the precipitation of substances contained in the water and deferring the appearance of corrosion phenomena in the containers or in the pipe system through which the liquid flows, and for the subsequent reduction of boiler scale and corrosion damage that has already occurred, but the changes in the properties themselves can be used in various other areas. As an example, the treatment according to the invention makes it possible to condition the water in swimming pools by using a smaller quantity of chemical additives than has been the case up to now. Thus, it is possible to achieve a specific disinfection effect with a smaller quantity of added chlorine than is possible with untreated water, and one can correct the ph-value of the water in a swimming pool by the addition of a smaller quantity of ph⁻ of ph+ additives.

During the process according to the invention there is practically no electrical current flow between the liquid that is connected electrically to a high-voltage potential relative to the insulated electrodes and the electrically insulated electrodes. There may possibly be a negligible leakage current that is extremely small through the finite insulation resistance to the insulating material that covers the electrodes.

In the process according to the invention, the treatment effect is substantially influenced by the field strength and by the charge density on the surface layer of the liquid to be treated that is facing the insulated electrode.

BRIEF DESCRIPTION OF THE DRAWINGS

The invention is described in greater detail below on the bases of examples that are shown in the drawings. The drawings show.

DETAILED DESCRIPTION OF THE PREFERRED EMBODIMENTS

Figure 1:
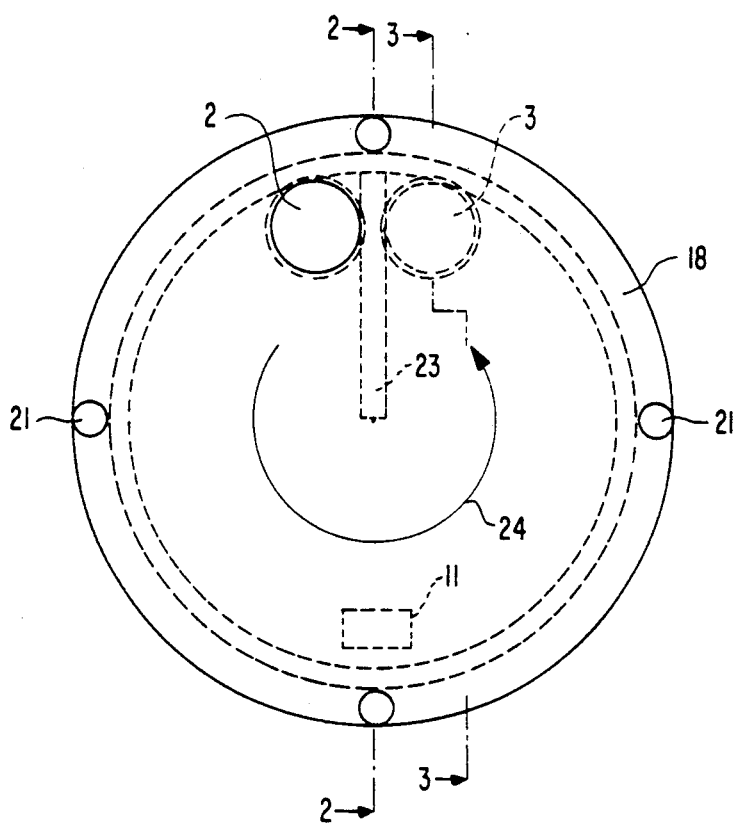
FIG. 1: A first embodiment of a device according to the invention in a plan view.
Figure 2:
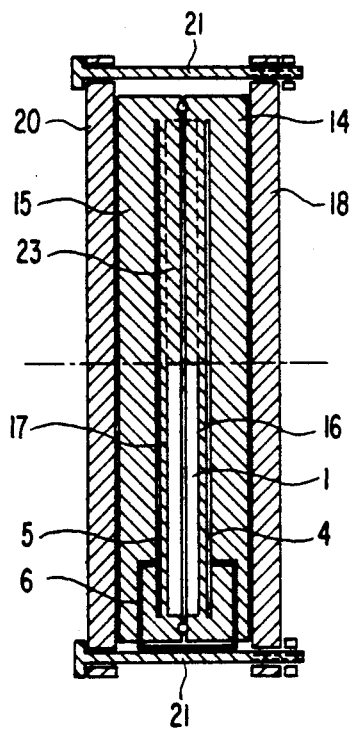
FIG. 2: This embodiment in cross-section on the line 2—2 in FIG. 1.
Figure 3:
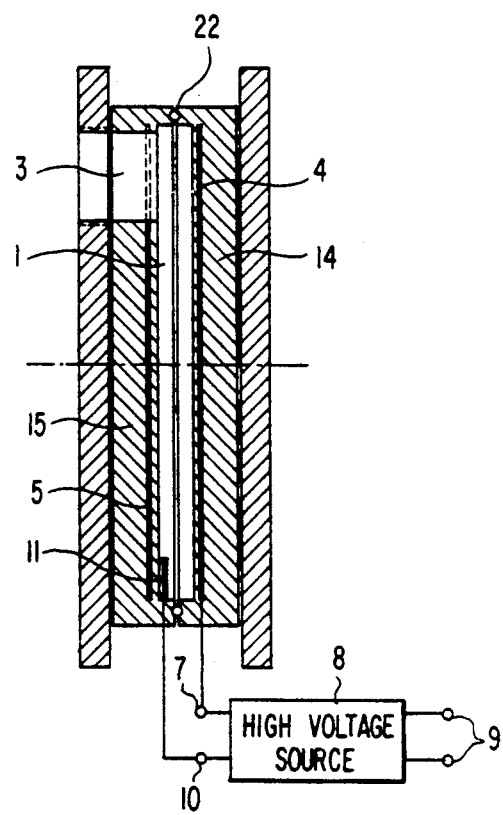
FIG. 3: This embodiment in cross-section on the line 3—3 in FIG. 1.

The embodiment of shown in FIGS. 1 to 3 has a treatment chamber 1 through which the liquid to be treated is flowing. Inlet and outlet openings 2, 3 are provided for the inflow and outflow of the liquid to be treated. The direction of flow can be in either direction. On both sides of the treatment chamber 1 two electrodes 4, 5 are arranged which are electrically insulated from the treatment chamber 1. Electrodes 4, 5 are connected in an electrically conducting manner by means of line 6. One terminal 7 of an electrical high-voltage source 8 is connected to the electrodes 4, 5. The high-voltage source 8 is provided with electrical energy through input terminals 9 from an electrical supply network. The other terminal 10 of the high-voltage source 8 is connected to a contact electrode 11, which forms an electrical connection to the aqueous liquid within the treatment chamber 1. The contact electrode 11 can be disposed directly in the treatment chamber 1; it may, however, also be formed by another electrically conducting part, in contact with the liquid flowing through the treatment chamber 1, such as by metal pipes, which lead to the inflow or outflow opening of the device.

Figure 4:
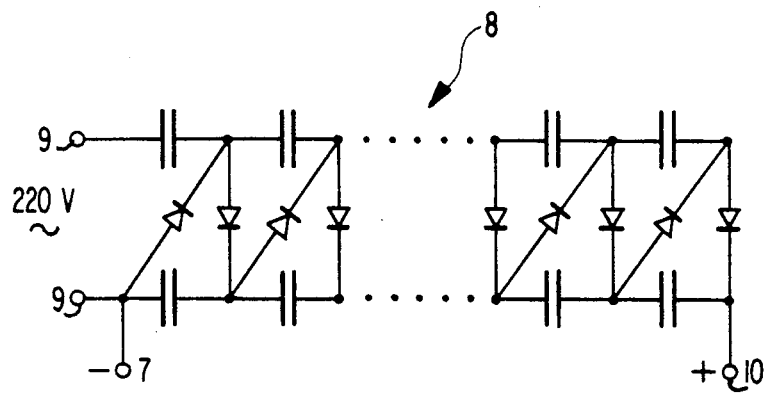
FIG. 4: shows the circuit of a high-voltage source provided for the device according to the invention.

The high-voltage source 8 can be in the form of a condenser-rectifier-cascade circuit, as shown in FIG. 4. However, other configurations of high-voltage sources can be used, e.g., combinatorial circuits with high-voltage output, and, if desired, the high-voltage source can be provided with a separation transformer for the galvanic separation of the power supply. If necessary, the high-voltage source can also be an ac-voltage source.

The treatment chamber 1 is in the form of a flat can, consisting of two can halves 14, 15 of synthetic material. The electrodes 4, 5 are embedded into the flat side walls 16, 17 of the can halves 14, 15. The can halves 14, 15 are arranged between two clamping plates 18, 20 made of metal, which, in turn, are held together by clamping screws 21. By means of the clamping plates 18, 20, the can halves 14, 15 are pressed together, and a sealing ring 22 is inserted between the facing rims of the can halves 14, 15.

Within the treatment chamber 1 a bridge 23 is provided by ribs molded onto the can halves 14, 15, by means of which a U-shaped flow path through the treatment chamber is formed, which is indicated in FIG. 1 by an arrow 24 and leads from the inflow to the outflow opening. These openings 2, 3 adjoin each other on opposite sides of the bridge 23.

In practically arranged devices which were used for the treatment of water to prevent the formation of boiler scale or to remove boiler scale, a high-voltage between 3.5 and 6 kV, preferably a high-voltage of 5 kV was used. The walls 16, 17 separating the electrodes 4, 5 from the water in the treatment chamber 1 had a thickness of 3 mm.

Figure 5:
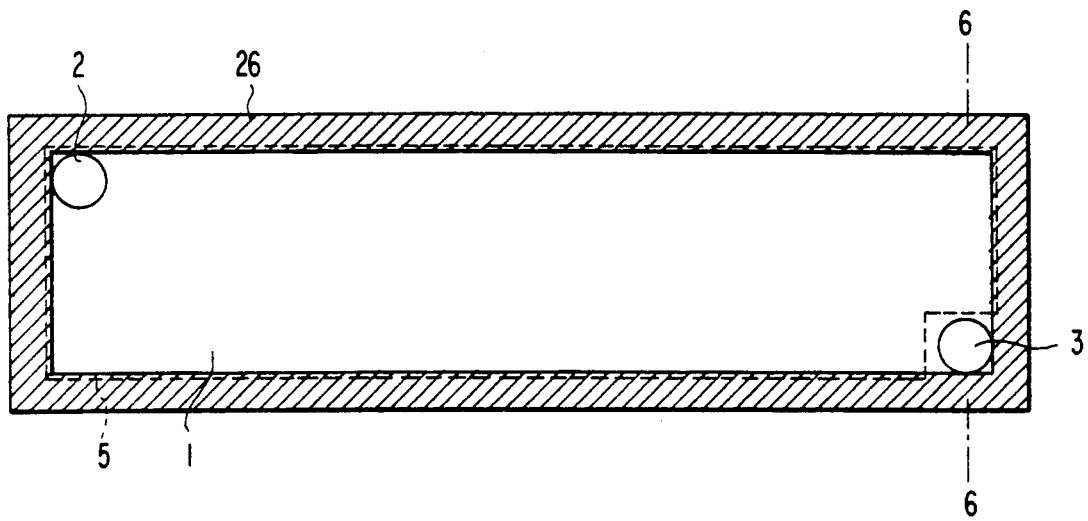
FIGS. 5 and 6 show another embodiment in two cross-sections, with FIG. 5 is a cross-section along line 5—5 in FIG. 6 and FIG. 6 a cross-section along line 6—6 in FIG. 5.
Figure 6:
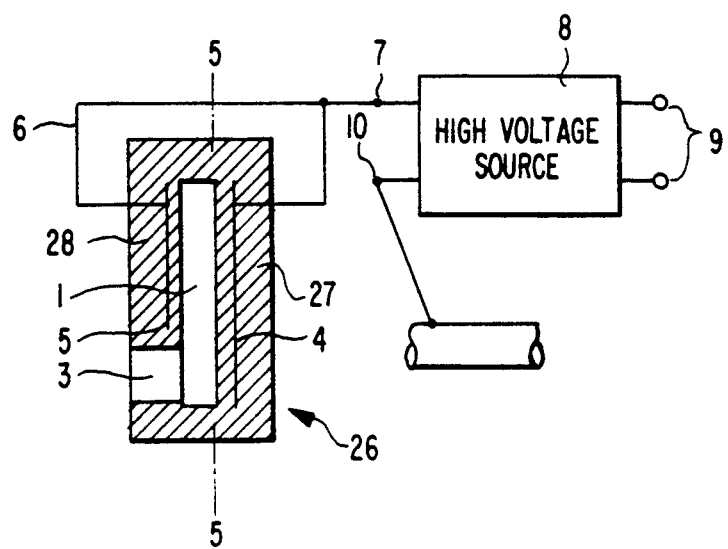

In the embodiment of shown in FIGS. 5 and 6 the treatment chamber 1 has an elongated shape and is constructed as a cavity of a synthetic material container 26, in the walls 27, 28 of which the electrodes 4, 5 are embedded. Analogous to the embodiment according to FIGS. 1 to 3, the electrodes 4, 5 are electrically connected by a line 6 coupled to one terminal 7 of a high-voltage source 8; the other terminal 10 of the high-voltage source 8 is connected to a metallic feed tube, through which the liquid flows into the treatment chamber. In this case too, the high-voltage source 8 can be constructed in various forms, as discussed above.

I claim:
1. An apparatus for the treatment of an aqueous liquid, comprising:
   a) a treatment chamber (1) made of an electrically insulating material and defining a liquid circulation path from an inlet port (2) to an outlet port (3),
   b) exclusively, just two flat electrode plates (4, 5) disposed parallel to and spaced from each other, in opposite side walls of said treatment chamber, and extending continuously along said liquid circulation path, said electrode plates being individually insulated from liquid in the chamber by a thin layer of electrical insulation material,
   c) means (6) electrically connecting said two electrode plates together,
   d) a d.c. high voltage source (8),
   e) means connecting one terminal of said source to said electrode plates such that the same d.c. voltage is applied to both of said plates, and
   f) means connecting another, opposite polarity terminal of said d.c. high voltage source to electrically conductive means disposed in direct contact with the liquid such that said circulating liquid is subjected to an electrostatic field established between the two electrode plates and the liquid itself and being uninterrupted and of the same polarity along the extension of the liquid circulation path between said two flat electrode plates;
   wherein the treatment chamber is shaped in the form of a flat, cylindrical can, and further wherein a U-shaped circulation path is formed in the treatment chamber by a radial wall (23) disposed between said side walls and extending from an outer periphery of the chamber towards a center thereof, and the inlet and outlet ports are arranged adjacent each other on opposite sides of the radial wall.

2. An apparatus according to claim 1, wherein the treatment chamber is formed by two can halves (14, 15) made from synthetic material, the two electrodes are individually embedded in side walls of the can halves, and the can halves are disposed between two clamping plates (18, 20) made of metal and are compressed thereby.

* * * * *

UNITED STATES PATENT AND TRADEMARK OFFICE
CERTIFICATE OF CORRECTION

PATENT NO. : 5,264,102
DATED : November 23, 1993
INVENTOR(S) : Gerhard Eibl

It is certified that error appears in the above-indentified patent and that said Letters Patent is hereby corrected as shown below:

On the title page, Item [30] Foreign Application Priority Data, add

| | | |
|---|---|---|
| January 21, 1986 | Austria et al. | PCT/AT86/0007 |
| September 15, 1986 | PCT | PCT/AT86/00055 |

Signed and Sealed this

Twelfth Day of July, 1994

Attest:

BRUCE LEHMAN

Attesting Officer      Commissioner of Patents and Trademarks